(12) United States Patent
Kondou (10) Patent No.: US 7,930,887 B2
(45) Date of Patent: Apr. 26, 2011

(54) HYDRAULIC MASTER CYLINDER AND VEHICLE PROVIDED WITH THE SAME

(75) Inventor: Hiroshi Kondou, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 398 days.

(21) Appl. No.: 12/034,574

(22) Filed: Feb. 20, 2008

(65) Prior Publication Data

US 2008/0196402 A1    Aug. 21, 2008

(30) Foreign Application Priority Data

Feb. 20, 2007 (JP) ................... 2007-039119
Jan. 7, 2008 (JP) ................... 2008-000821

(51) Int. Cl.
*B60T 11/28* (2006.01)

(52) U.S. Cl. ........................................ 60/589
(58) Field of Classification Search .............. 60/589
See application file for complete search history.

(56) References Cited

U.S. PATENT DOCUMENTS

| | | | |
|---|---|---|---|
| 3,357,181 A * | 12/1967 | Thirion ........................... | 60/588 |
| 4,939,901 A * | 7/1990 | Saalbach et al. ................. | 60/589 |
| 5,046,316 A * | 9/1991 | Steffes et al. .................... | 60/589 |
| 5,607,207 A * | 3/1997 | Nagashima et al. ............. | 60/545 |
| 6,386,648 B1 * | 5/2002 | Wasson ........................... | 60/589 |
| 2003/0014970 A1 | 1/2003 | Welter et al. | |

FOREIGN PATENT DOCUMENTS

| | | |
|---|---|---|
| JP | 03-034983 U | 4/1991 |
| JP | 10-250666 A | 9/1998 |
| JP | 2006-282001 | 10/2006 |

* cited by examiner

*Primary Examiner* — F. Daniel Lopez
(74) *Attorney, Agent, or Firm* — Keating & Bennett, LLP (57) ABSTRACT

A rear brake control hydraulic master cylinder that dispenses with adjustment work to decrease a clearance between a piston and a push member. A master cylinder 31 includes first and second oil chambers. The piston includes a piston oil passage portion connected to the first and second oil chambers. The push member abuts against and moves the piston to generate a hydraulic pressure in the first oil chamber. A compression spring biases the push member into contact with the piston when the piston is not moved substantially toward the first oil chamber.

19 Claims, 8 Drawing Sheets

HYDRAULIC MASTER CYLINDER AND VEHICLE PROVIDED WITH THE SAME

RELATED APPLICATIONS

This application claims the benefit of priority under 35 USC 119 of Japanese patent application no. 2007-039119, filed on Feb. 20, 2007, and Japanese patent application no. 2008-000821, filed on Jan. 7, 2008, which applications are hereby incorporated by reference in their entireties.

BACKGROUND OF THE INVENTION

1. Field of the Invention

The present invention relates to a hydraulic master cylinder for a vehicle, and more particularly to a hydraulic master cylinder including a cylinder portion and a piston, and a vehicle provided with the same.

2. Description of Related Art

A vehicular brake provided with a hydraulic master cylinder that includes a cylinder portion and a piston is known. JP-A-2006-282001, for example, discloses a vehicular brake device comprising a body, a control piston inserted slidably relative to an inner peripheral surface of the body, an input piston inserted slidably relative to an inner peripheral surface of the control piston, and an input rod connected to a brake pedal to push a rear end of the input piston. A flange portion of the control piston abuts against the body to inhibit rearward movement of the control piston relative to the body. A retaining ring at a rear end of the inner peripheral surface of the control piston inhibits rearward movement of the input piston relative to the control piston. That is, the input piston is positioned relative to the control piston and the body but is not positioned relative to the input rod.

However, the construction of JP-A-2006-282001 has a disadvantage in that a clearance is generated between the rear end of the input piston and the input rod since the input piston is positioned relative to the control piston and the body but is not positioned relative to the input rod. Therefore, there is a problem in that adjustment work to decrease a clearance between the input piston and the input rod when the vehicular brake device is assembled is necessary.

SUMMARY OF THE INVENTION

The invention solves this problem and has provides a hydraulic master cylinder, in which adjustment work to decrease a clearance between a piston and a push member is unnecessary.

A hydraulic master cylinder according to a first aspect of the invention comprises a cylinder portion including first and second oil chambers. A piston includes a first oil passage portion connected to the first and second oil chambers. A push member abuts against and moves the piston to generate hydraulic pressure in the first oil chamber. A first bias member biases the push member toward the piston and into contact with the piston when the piston is not moved substantially toward the first oil chamber.

According to the invention, the first bias member biases the push member toward the piston and into contact with the piston when the piston is not moved substantially toward the first oil chamber. The push member is thereby maintained in a state of contact with the piston, and adjustment work to remove a clearance between the push member and the piston when the hydraulic master cylinder is assembled is not necessary.

In one embodiment, a support member is fixed to the cylinder portion and supports the first bias member. The first bias member is thereby supported on the support member and stably biases the push member toward the piston.

In one embodiment, the first bias member includes a spring member. The push member includes a flange portion that engages with the spring member. The support member includes a support portion that supports the spring member. The spring member is arranged between the support portion of the support member and the flange portion of the push member. The spring member thereby biases the flange portion of the push member when the spring member is biased against the support portion of the support member fixed to the cylinder portion, so that the spring member readily biases the push member against an opposite side to the support member.

In one embodiment, the support member has an insertion hole into which the flange portion of the push member can be inserted. The flange portion of the push member is thereby readily inserted into the insertion hole of the support member.

In one embodiment, a first outside diameter of one end of the spring member is smaller than an outside diameter of the flange portion of the push member. A second outside diameter of the other end of the spring member is larger than a hole diameter of the insertion hole of the support member. One end of the spring member is thereby inhibited from coming off the flange portion of the push member when the one end of the spring member engages with the flange portion, and the other end of the spring member is thereby inhibited from coming off the insertion hole of the support member when the other end of the spring member is arranged on the support member.

In one embodiment, the spring member comprises a compression spring. The push member is thereby readily biased against a side opposite to the support member when the compression spring is arranged between the support portion of the support member and the flange portion of the push member.

In one embodiment, a screw member fixes the support member to the cylinder portion, and the support member comprises a holding plate having a mount hole into which the screw member is inserted. The holding plate is thereby readily fixed to the cylinder portion by the screw member.

In one embodiment, a second bias member is provided in the first oil chamber of the cylinder portion to bias the piston toward the second oil chamber. The bias of the second bias member, by which the piston is biased toward the second oil chamber, is larger than the bias of the first bias member, by which the push member is biased toward the piston. When the hydraulic master cylinder is not actuated, the piston is thereby inhibited from moving toward the first oil chamber while the first bias member biases the push member into contact with the piston.

In one embodiment, a reservoir tank is connected to the second oil chamber of the cylinder portion. A cylindrical-shaped member includes a second oil passage portion capable of flowing between the reservoir tank and the second oil chamber. The piston is formed with a long hole portion extending in a direction in which the piston is moved, and into which the cylindrical-shaped member is inserted. One side of the long hole portion abuts against the cylindrical-shaped member when the piston is not moved substantially toward the first oil chamber. When the piston is not moved toward the first oil chamber, one side of the long hole portion of the piston and the cylindrical-shaped member thereby abut against each other to readily arrange the piston in a predetermined position.

In one embodiment, a valve member closes a side of the first oil passage portion toward the first oil chamber when the piston is moved toward the first oil chamber. A third bias member biases the valve member toward the second oil chamber to cause the valve member to close a side of the first oil passage portion toward the first oil chamber when the piston is moved toward the first oil chamber. When the piston is moved toward the first oil chamber, the valve member and the third bias member thereby readily close the first oil passage portion.

In one embodiment, a reservoir tank is connected to the second oil chamber. A cylindrical-shaped member is provided in the second oil chamber and includes a second oil passage portion capable of flowing between the reservoir tank and the second oil chamber. The valve member includes an abutting portion that abuts against the cylindrical-shaped member when the piston is not moved substantially toward the first oil chamber and contacts the piston, so as not to close a side of the first oil passage portion toward the first oil chamber. When the piston is not moved toward the first oil chamber, the first oil passage portion is thereby put in an opened state, so that oil in the first oil chamber, oil in the second oil chamber, and oil in the reservoir tank is caused to flow.

In one embodiment, the cylinder portion includes a first oil passage port connecting between the first oil chamber and a braking portion, and a second oil passage port connecting between the second oil chamber and a reservoir tank. A first filter is provided on the first oil passage port, and a second filter is provided on the second oil passage port. Foreign matter is thereby prevented from invading the cylinder portion from the braking portion and the reservoir tank, so that a decrease in hydraulic pressure in the piston provided in the cylinder portion is suppressed.

In one embodiment, the braking portion is connected to the first oil passage port on which the first filter is provided through a braking force control unit that ensures steerability at the time of quick braking. The first filter thereby prevents foreign matter in the braking force control unit and the braking portion from invading the cylinder portion.

In one embodiment, the hydraulic master cylinder controls a brake of a motorcycle. A brake of a motorcycle is thereby obtained without the necessity of adjustment work to remove a clearance between the push member and the piston when the hydraulic master cylinder is assembled.

A vehicle according to the invention comprises the hydraulic master cylinder described above. A vehicle is thereby obtained without the necessity of adjustment work to remove a clearance between the push member and the piston when the hydraulic master cylinder is assembled.

Other features and advantages of the invention will be apparent from the following detailed description, taken in conjunction with the accompanying drawings which illustrate, by way of example, various features of embodiments of the invention.

DETAILED DESCRIPTION OF THE INVENTION

An embodiment of the invention is now described with reference to the drawings.

First Embodiment

Figure 1:
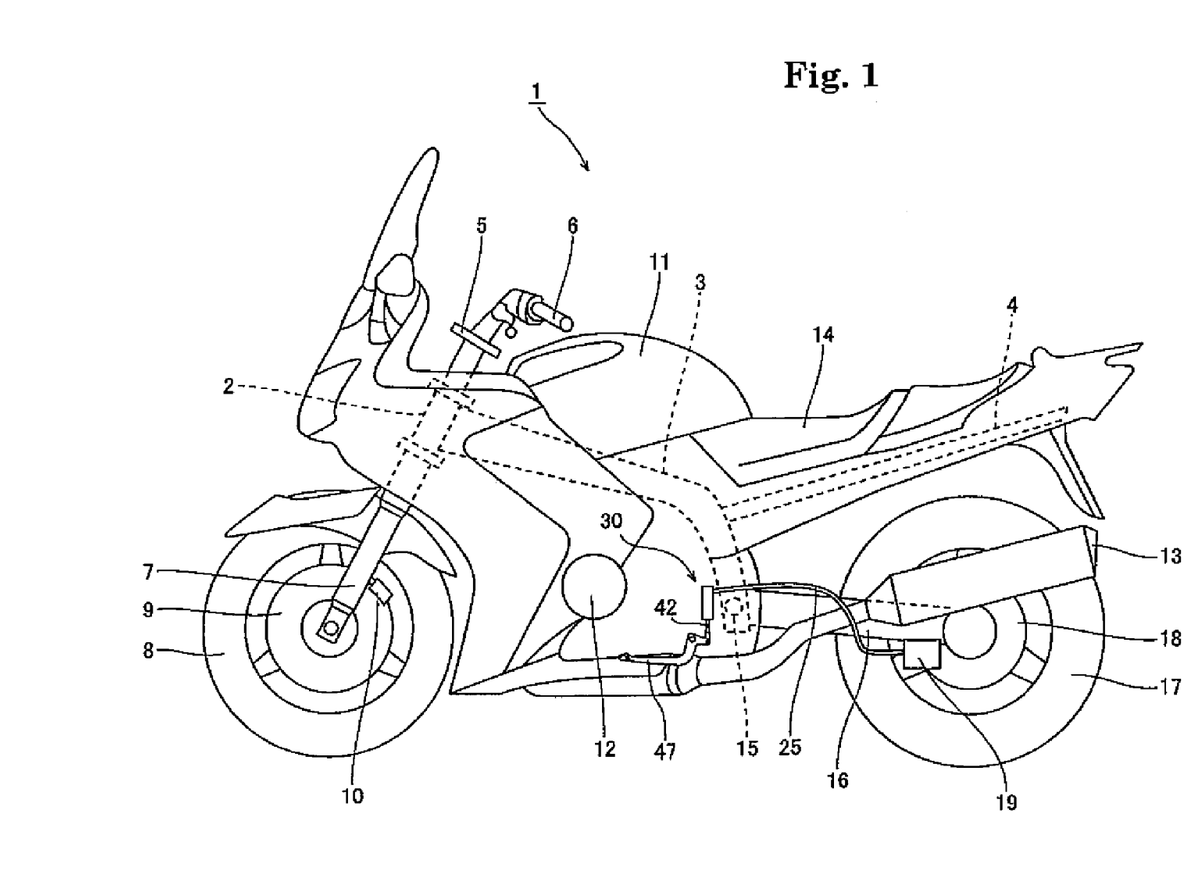
FIG. 1 is a side view of a motorcycle having a rear brake control hydraulic master cylinder according to a first embodiment of the invention.
Figure 2:
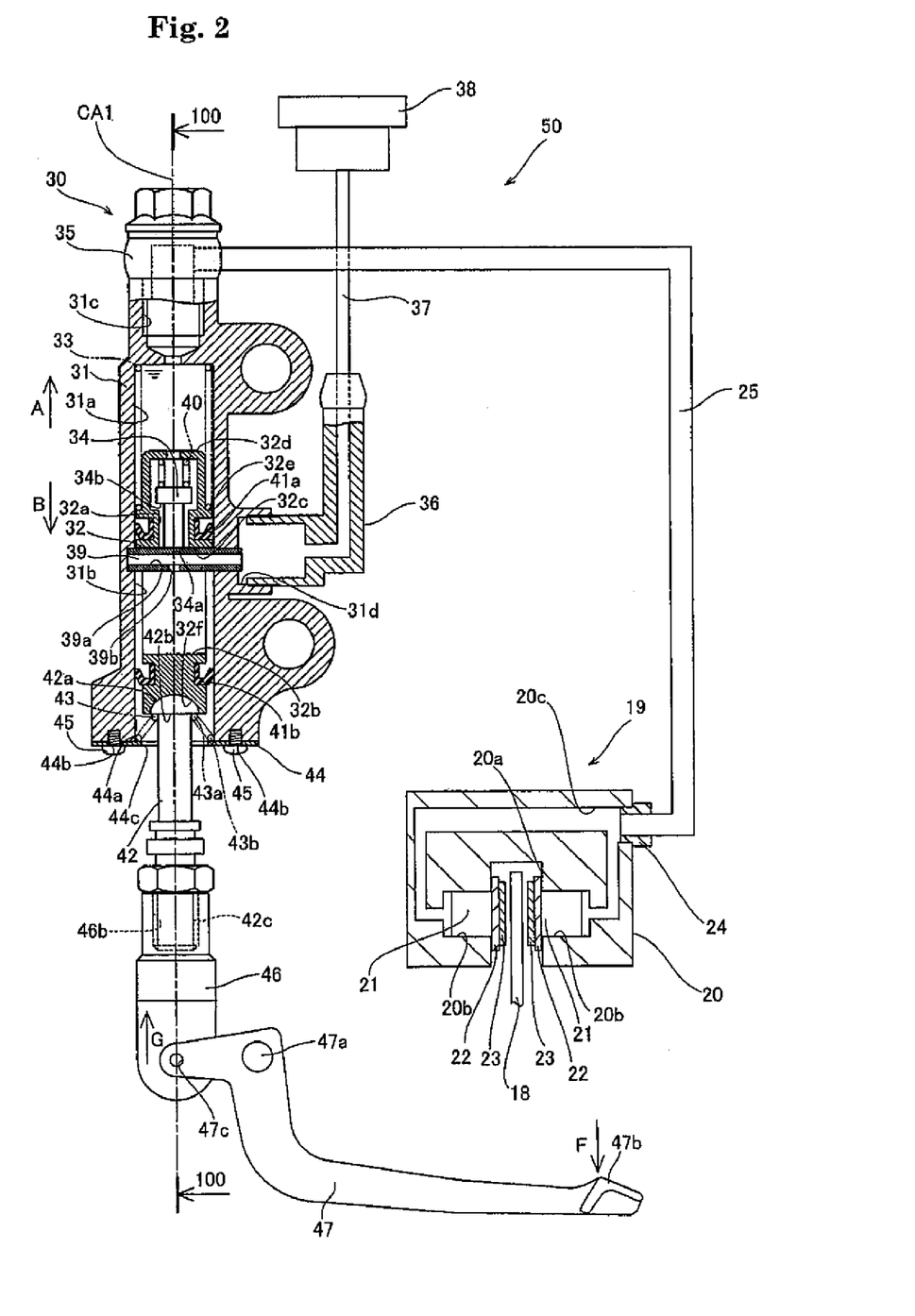
FIG. 2 is a cross sectional view of a rear caliper connected to the rear brake control hydraulic master cylinder of FIG. 1.
Figure 3:
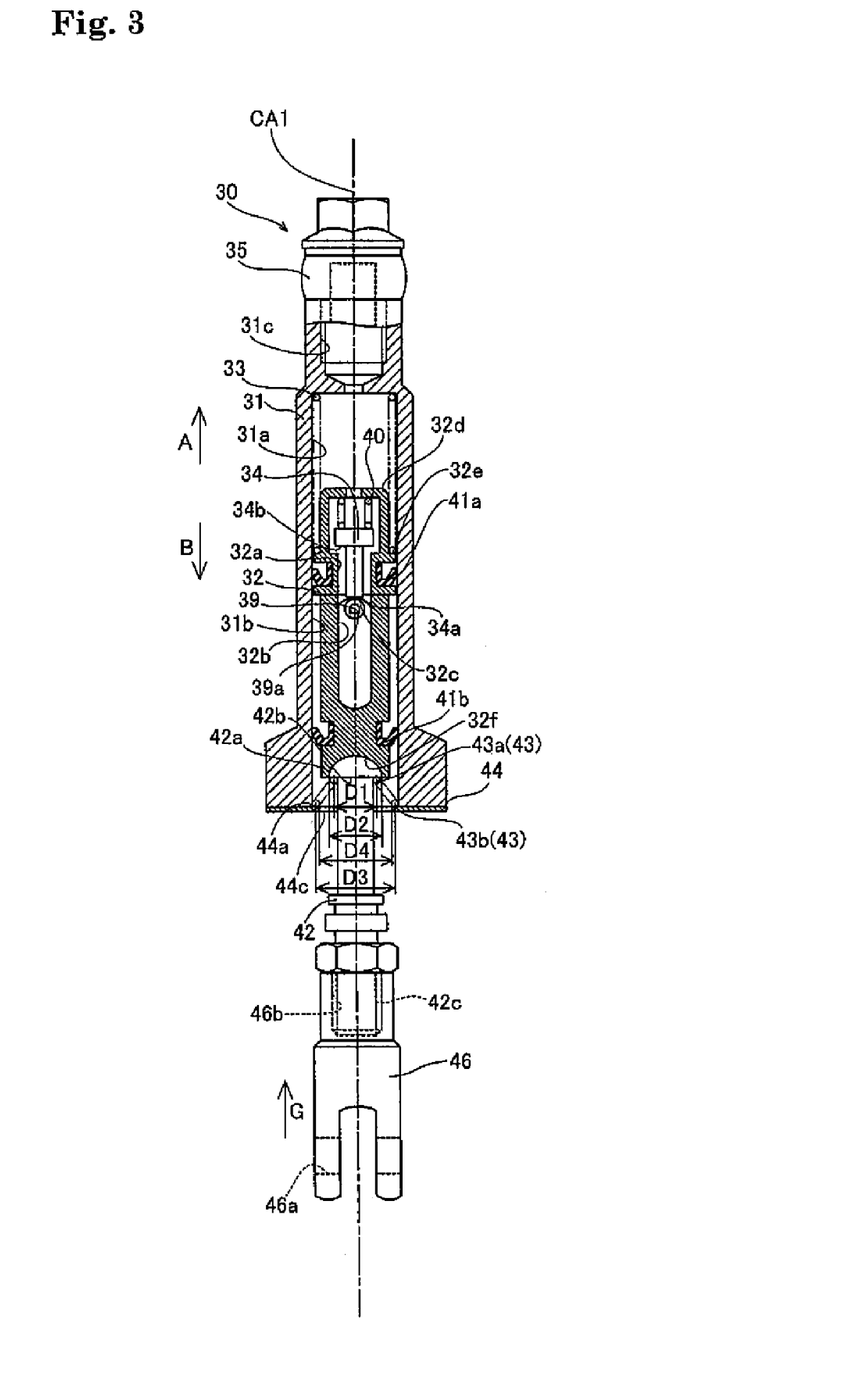
FIG. 3 is a cross sectional view taken along line 100-100 of FIG. 2.

FIG. 1 is a side view of a motorcycle having a rear brake control hydraulic master cylinder according to a first embodiment of the invention. FIG. 2 is a cross sectional view of a rear caliper connected to the rear brake control hydraulic master cylinder of FIG. 2. FIG. 3 is a cross sectional view taken along line 100-100 of FIG. 2. Referring to FIGS. 1-3, a brake control hydraulic master cylinder 30 mounted on a motorcycle 1 is described.

In motorcycle 1, a front end of a main frame 3 is connected to a head pipe 2. Main frame 3 extends rearward and downward. A seat rail 4 connected to main frame 3 extends rearward and upward. A steering mechanism 5 is mounted to head pipe 2 to be able to turn. A handle 6 is mounted to an upper side of steering mechanism 5. A front fork 7 is mounted to a lower side of steering mechanism 5. A front wheel 8 is mounted rotatably to a lower end of front fork 7. A front disk rotor 9 mounted to front wheel 8 rotates with front wheel 8. A front caliper 10 mounted to front fork 7 interposes front disk rotor 9.

A fuel tank 11 is arranged above main frame 3 and an engine 12 is mounted below main frame 3. A muffler 13 is connected to engine 12. A seat 14 is arranged above seat rail 4. A front end of a swing arm 16 is mounted to a rear end of main frame 3 through a pivot shaft 15. A rear wheel 17 is mounted rotatably to a rear end of swing arm 16. A rear disk rotor 18 mounted to rear wheel 17 rotates with rear wheel 17. A rear caliper 19 mounted to swing arm 16 interposes rear disk rotor 18.

Rear caliper 19 comprises a caliper body 20 formed with a groove portion 20a as shown in FIG. 2. Rear disk rotor 18, which rotates with rear wheel 17, is arranged inside groove portion 20a. A pair of cylinder portions 20b formed inside groove portion 20a face each other. An oil passage port 20c is connected to cylinder portions 20b. Caliper pistons 21 are fitted into cylinder portions 20b. Brake pads 23 are mounted through mount plates 22 to sides of caliper pistons 21 facing rear disk rotor 18. One end of an oil hose 25 is mounted to a connector 24 fitted into oil passage port 20c. Rear brake control hydraulic master cylinder 30 is connected to the other end of oil hose 25. Rear caliper 19 is an example of a "braking portion" of the invention.

Rear brake control hydraulic master cylinder 30 includes a master cylinder 31, a piston 32, a return spring 33 and a center valve 34. Master cylinder 31 is an example of a "cylinder portion" and return spring 33 is an example of a "second bias member" of the invention. Center valve 34 is an example of a "valve member" of the invention.

Figure 4:
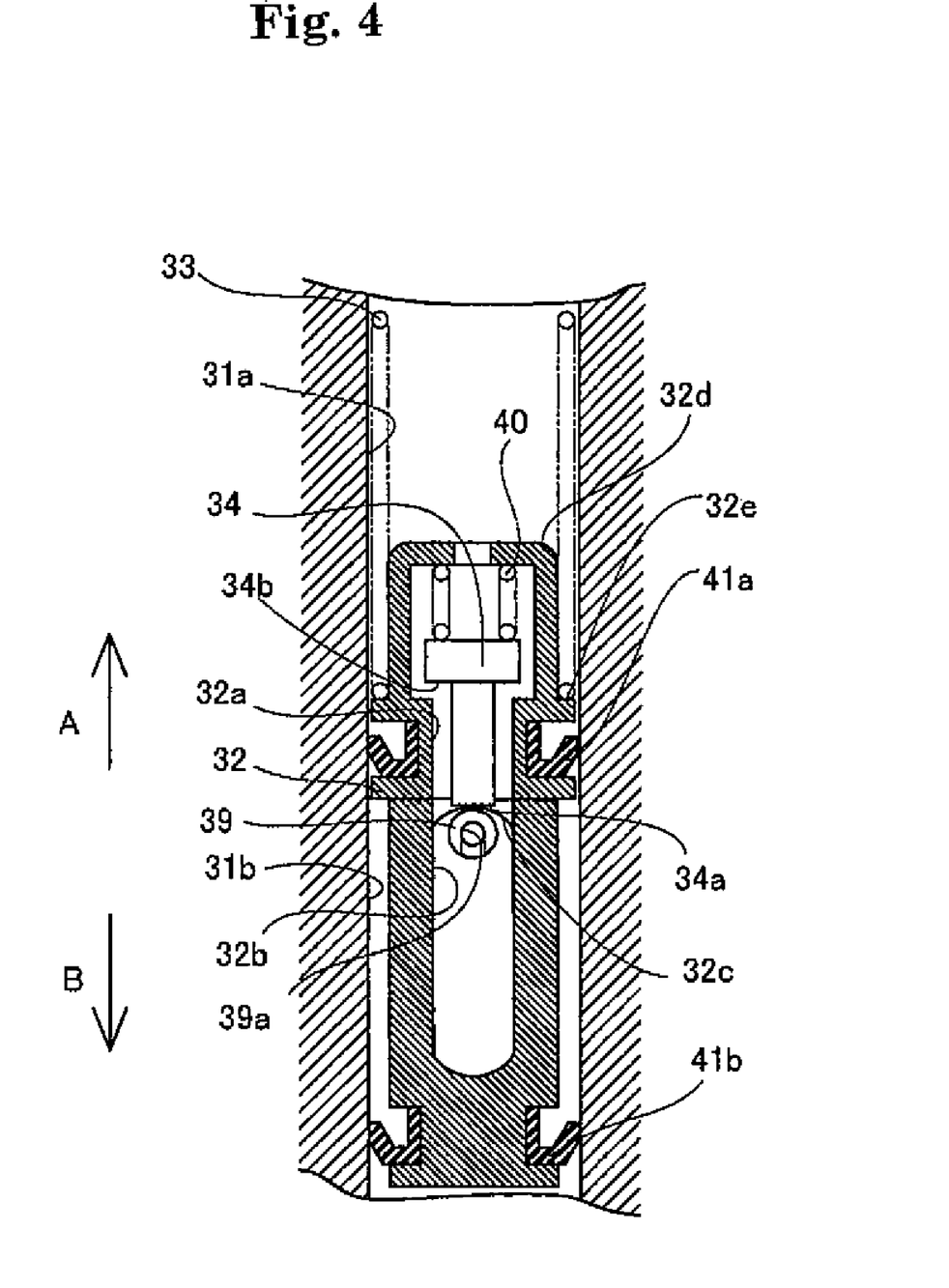
FIG. 4 is an enlarged cross sectional view of a periphery of a center valve shown in FIG. 3.

Piston 32 is fitted inside master cylinder 31 and movable in arrow A and B directions along a central axis CA1 of master cylinder 31. Piston 32 is formed with a piston oil passage portion 32a that connects between a first oil chamber 31a and a second oil chamber 31b (FIGS. 2 and 4). Piston oil passage portion 32a is an example of a "first oil passage portion" of the invention. As shown in FIG. 2, first oil chamber 31a is provided in the arrow A direction from piston oil passage portion 32a and second oil chamber 31b is provided in the arrow B direction from piston oil passage portion 32a. A push member 42 pushes piston 32 in the arrow A direction. A return spring 33 arranged in first oil chamber 31a always biases piston 32 in the arrow B direction toward second oil chamber 31b. A center valve 34 provided on a side of piston oil passage portion 32a toward first oil chamber 31a closes the side of piston oil passage portion 32a toward first oil chamber 31a when piston 32 is moved toward first oil chamber 31a.

Master cylinder 31 is formed with a first oil passage port 31c and a second oil passage port 31d. A connector 35 is fitted into a portion of first oil passage port 31c in the arrow A direction. The other end of oil hose 25, which is connected at one end thereof to connector 24 of caliper body 20, is mounted to connector 35. First oil passage port 31c is thereby connected to caliper body 20. A portion of first oil passage port 31c in the arrow B direction is connected to first oil chamber 31a. First oil chamber 31a is thereby connected to rear caliper 19 so that hydraulic pressure in first oil chamber 31a can be transmitted to rear caliper 19.

A connector 36 is fitted into second oil passage port 31d. A reservoir tank 38 is connected to connector 36 through an oil hose 37. A cylindrical-shaped member 39 formed with a hollow-shaped oil passage portion 39a is also connected to second oil passage port 31d. Specifically, cylindrical-shaped member 39 is fitted into second oil chamber 31b and perpendicular to central axis CA1 of master cylinder 31 (second oil chamber 31b).

Cylindrical-shaped member 39 holds piston 32, which is biased by return spring 33 in the arrow B direction, when piston 32 is not moved substantially toward first oil chamber 31a. As shown in FIGS. 2 and 3, piston 32 is formed with a long hole portion 32b extending in the arrow A and B direction in which piston 32 is moved. Cylindrical-shaped member 39 is inserted into long hole portion 32b and abuts against one side 32c of long hole portion 32b. An oil passage hole 39b provided on a side of cylindrical-shaped member 39 enables communication between oil passage portion 39a and second oil chamber 31b. That is, cylindrical-shaped member 39 connects between reservoir tank 38 and second oil chamber 31b through second oil passage port 31d, connector 36 and oil hose 37 in a manner to enable communication therebetween. Oil passage portion 39a and oil passage hole 39b are an example of a "second oil passage portion" of the invention.

Reservoir tank 38 maintains a predetermined hydraulic pressure in second oil chamber 31b. When the hydraulic pressure in second oil chamber 31b is excessively high, oil in second oil chamber 31b is discharged into reservoir tank 38. On the other hand, when the hydraulic pressure of second oil chamber 31b is excessively low, reservoir tank 38 replenishes second oil chamber 31b with oil.

A spring holding portion 32d provided on one end side of piston 32 holds a compression spring 40. Compression spring 40 is an example of a "third bias member" of the invention and biases center valve 34 in the arrow B direction toward second oil chamber 31b. Specifically, when piston 32 is moved toward first oil chamber 31a, center valve 34 is biased by compression spring 40 in the arrow B direction to close the side of piston oil passage portion 32a toward first oil chamber 31a. One end 34a of center valve 34 abuts against cylindrical-shaped member 39 when piston 32 is not moved substantially toward first oil chamber 31a and push member 42 contacts piston 32. That is, although center valve 34 is biased in the arrow B direction toward second oil chamber 31b by compression spring 40, a seal portion 34b on the other end side of center valve 34 does not close the side of piston oil passage portion 32a toward first oil chamber 31a. The one end 34a of center valve 34 is an example of an "abutting portion" of the invention. A second spring holding portion 32e in the vicinity of an outer periphery of spring holding portion 32d holds return spring 33. A bearing portion 32f, into which a push portion 42a of push member 42 is fitted, is formed on the other end side of piston 32. Bearing portion 32f has a spherical-shaped concave surface. A primary seal 41a mounted to second spring holding portion 32e seals between first oil chamber 31a and second oil chamber 31b, and a secondary seal 41b mounted to bearing portion 32f inhibits oil from leaking outside piston 32.

Push portion 42a of push member 42 is fitted into bearing portion 32f of piston 32 in an abutting state. Push member 42 pushes piston 32 in the arrow A direction to generate hydraulic pressure in first oil chamber 31a.

A flange portion 42b extending in an outer peripheral direction is formed in the vicinity of push portion 42a. One end 43a of a compression spring 43 engages with flange portion 42b. Specifically, compression spring 43 is interposed between a support portion 44a of a holding plate 44 and flange portion 42b of push member 42.

Compression spring 43 biases push member 42 in the arrow A direction toward piston 32 and brings push portion 42a into contact with bearing portion 32f of piston 32 when piston 32 is not moved at least substantially toward first oil chamber 31a. The bias with which compression spring 43 biases push member 42 in the arrow A direction is smaller than that with which return spring 33 biases piston 32 in the arrow B direction. That is, compression spring 43 inhibits piston 32 from moving substantially toward first oil chamber 31a when master cylinder 31 is not actuated. Compression spring 43 is an example of a "first bias member" and a "spring member" of the invention.

A diameter D1 of the one end 43a of compression spring 43 is smaller than a diameter D2 of an outer periphery of flange portion 42b of push member 42 (FIG. 3). Diameter D1 is an example of a "first outside diameter" and diameter D2 is an example of an "outside diameter of flange portion" of the invention.

The other end 43b of compression spring 43 is supported on support portion 44a of holding plate 44. Holding plate 44 is an example of a "support member" of the invention. Mount holes 44b, into which two screw members 45 are inserted, are provided on holding plate 44. Holding plate 44 is fixed by screw members 45 to cover a side of master cylinder 31 in the arrow B direction. An insertion hole portion 44c, into which flange portion 42b of push member 42 can be inserted, is formed in holding plate 44. Push member 42, including flange portion 42b having a larger diameter than that of a shaft portion of push member 42, can be readily inserted into insertion hole portion 44c. Insertion hole portion 44c is an example of an "insertion hole" of the invention. A diameter D3 of the other end 43b of compression spring 43 is larger than a hole diameter D4 of insertion hole portion 44c (FIG. 3). Diameter D3 is an example of a "second outside diameter" of the invention.

Diameter D3 of the other end 43b of compression spring 43 is larger than diameter D1 of the one end 43a thereof (FIG. 3). Compression spring 43 is expandable so that when compression spring 43 is inserted from a side of push portion 42a of push member 42 to be assembled, diameter D1 of the other end 43a becomes larger than diameter D2 of the outer periphery of flange portion 42b (FIG. 3).

One end side (in the arrow A direction) of a connecting member 46 is mounted to a side (in the arrow B direction) of push member 42 opposite to push portion 42a. As shown in FIGS. 1 and 2, a foot lever 47 is mounted pivotally to a connection 46a (FIG. 3) in the vicinity of the other end (in the arrow B direction) of connecting member 46. As a foot lever portion 47b is pushed in an arrow F direction, foot lever portion 47b turns about a turning center 47a, an acting portion 47c is moved in an arrow G direction, and push member 42 is moved in the arrow A direction. A rear brake 50 is formed from rear caliper 19, brake control hydraulic master cylinder 30 and foot lever 47. Rear brake 50 is an example of a "brake" of the invention. An adjustment screw portion 42c and a screw hole portion 46b are provided on a connection between push member 42 and connecting member 46. Adjustment screw portion 42c and screw hole portion 46b allow adjustment to make a position of connection 46a of connecting member 46 and a position of acting portion 47c of foot lever 47 agree with each other.

Figure 5:
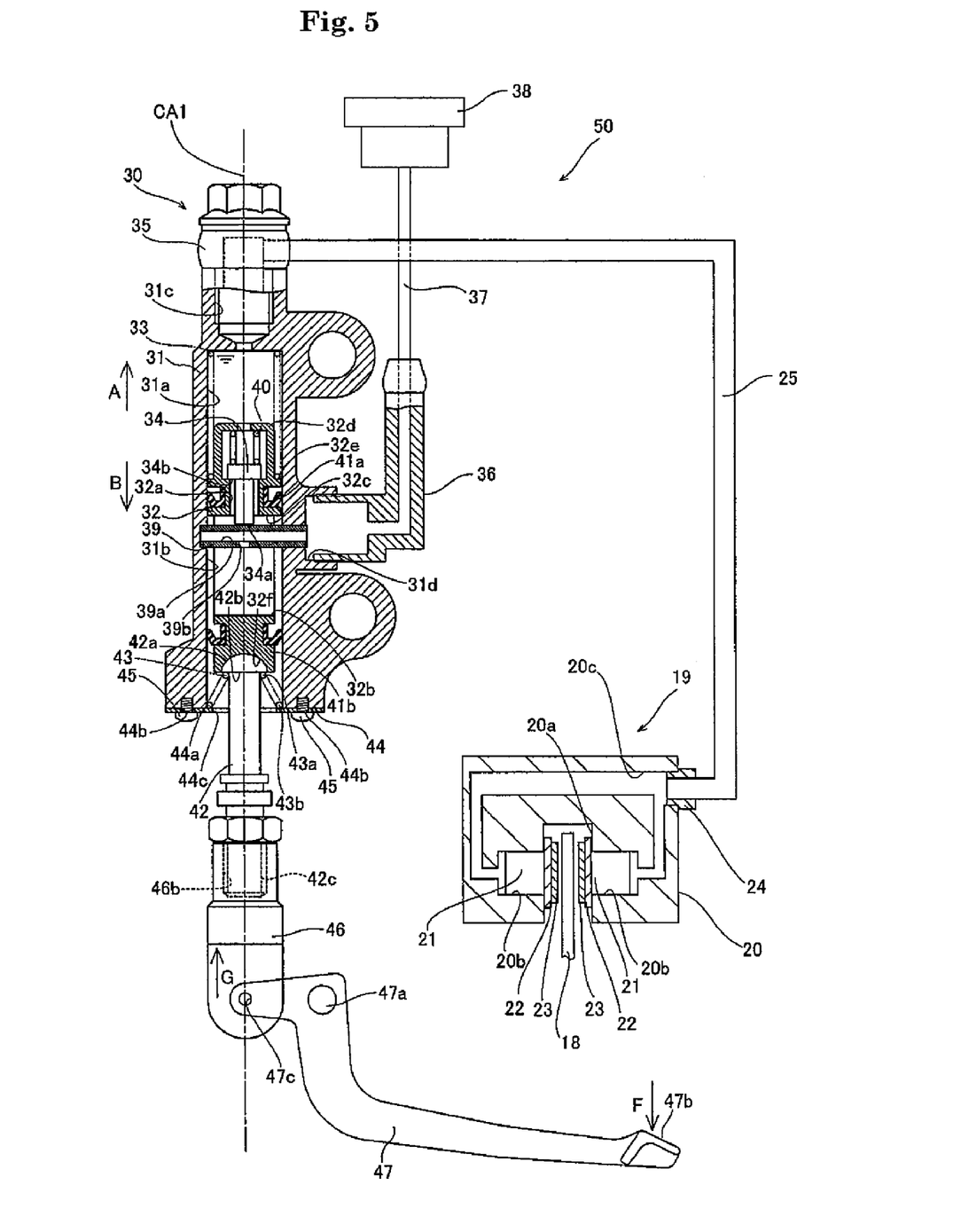
FIG. 5 is a cross sectional view illustrating a brake operation making use of the rear brake control hydraulic master cylinder of FIG. 2.
Figure 6:
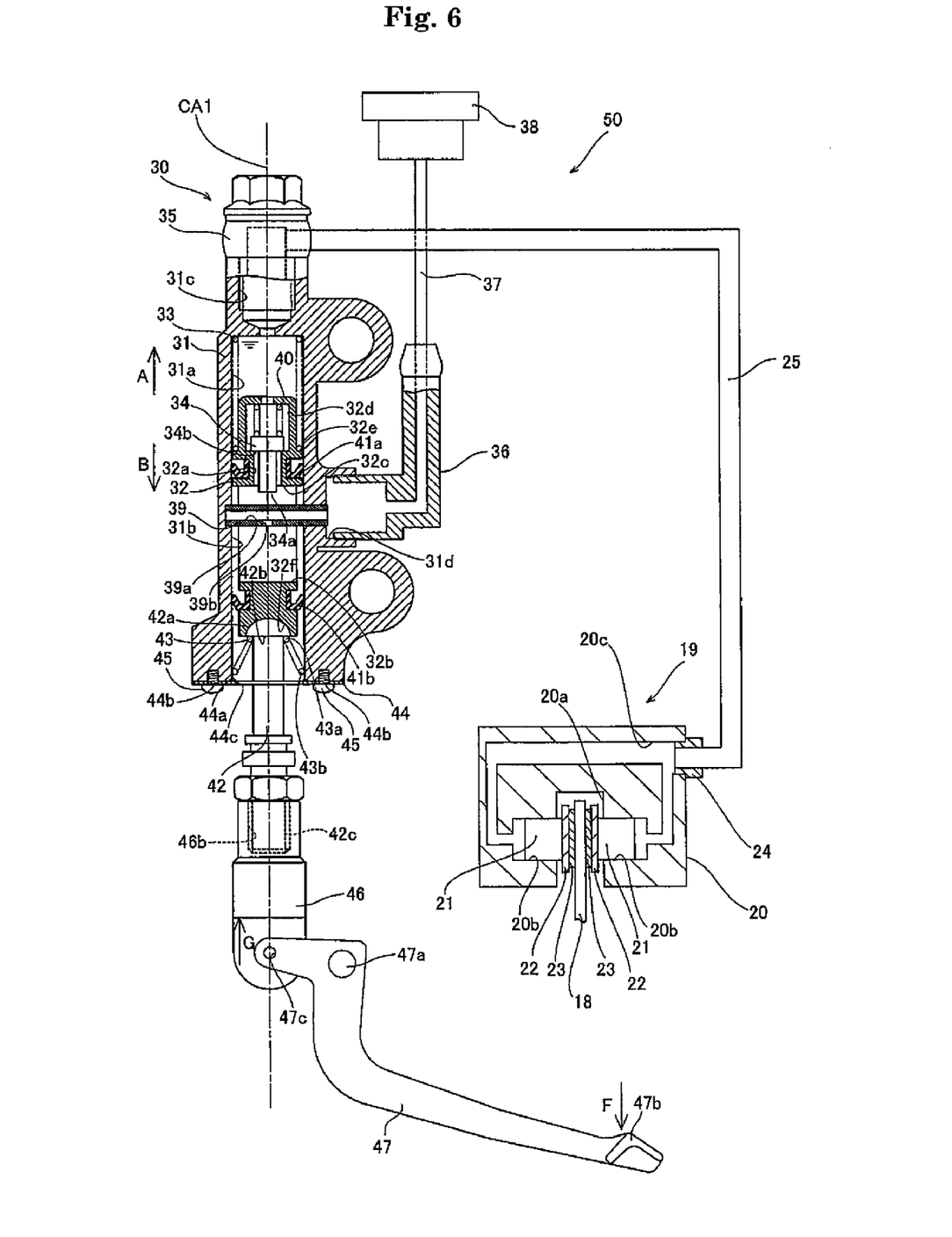
FIG. 6 is a cross sectional view illustrating a brake operation making use of the rear brake control hydraulic master cylinder of FIG. 2.

FIGS. 5 and 6 are cross sectional views of a brake operation using the rear brake control hydraulic master cylinder of the first embodiment. A brake operation using rear brake control hydraulic master cylinder 30 of the first embodiment is described with reference to FIGS. 2, 5 and 6.

First, foot lever portion 47b of foot lever 47 is manipulated in the arrow F direction from a state shown in FIG. 2. Thereby, push member 42 is moved in the arrow A direction while pushing piston 32 in the arrow A direction in a state in which push portion 42a is fitted into bearing portion 32f of piston 32. At this time, the one side 32c of long hole portion 32b of piston 32, having abutted against cylindrical-shaped member 39, separates from cylindrical-shaped member 39. Since push portion 42a of push member 42 was caused by compression spring 43 to contact bearing portion 32f of piston 32 before foot lever 47 was manipulated, it moves piston 32 in the arrow A direction by movement of push member 42 in the arrow A direction.

Since center valve 34 is biased by compression spring 40 in the arrow B direction as shown in FIG. 5, it moves relative to long hole portion 32b of piston 32 while the one end 34a of center valve 34 abuts against cylindrical-shaped member 39, and the side of piston oil passage portion 32a toward first oil chamber 31a is closed by seal portion 34b of center valve 34. Thereby, since oil in first oil chamber 31a is inhibited as shown in FIG. 6 from moving toward second oil chamber 31b, it is possible to increase hydraulic pressure in first oil chamber 31a.

Hydraulic pressure in first oil chamber 31a is increased whereby oil in first oil chamber 31a flows into cylinder portions 20b of caliper body 20 through connector 35 connected to first oil passage port 31c and oil hose 25. Thereby, since hydraulic pressure in cylinder portions 20b is increased, caliper pistons 21 move toward rear disk rotor 18. Thereby, rear disk rotor 18 is interposed between brake pads 23 and a frictional force is generated between rear disk rotor 18 and brake pads 23 to stop rotation of rear disk rotor 18. Consequently, rotation of rear wheel 17, which rotates together with rear disk rotor 18, is also stopped.

According to the first embodiment, as described above, compression spring 43 brings push member 42 into contact with piston 32 when piston 32 is not moved substantially toward first oil chamber 31a, whereby compression spring 43 biases push member 42 in the arrow A direction toward piston 32 to maintain push member 42 in contact with piston 32. Thereby, since it is unnecessary to regulate a clearance between push member 42 and piston 32 to a small extent when brake control hydraulic master cylinder 30 is assembled, workability at the time of assembly is improved.

Also, according to the first embodiment, by arranging compression spring 43 between support portion 44a of holding plate 44 and flange portion 42b of push member 42, flange portion 42b of push member 42 is biased by compression spring 43 in a state, in which compression spring 43 is biased against support portion 44a of holding plate 44 fixed to master cylinder 31, so that the bias of compression spring 43 readily biases push member 42 to an opposite side (side in the arrow A direction) to holding plate 44.

Also, according to the first embodiment, since diameter D1 of the one end 43a of compression spring 43 is smaller than diameter D2 of the outer periphery of flange portion 42b of push member 42, the one end 43a of compression spring 43 is inhibited from coming off flange portion 42b. Also, since diameter D3 of the other end 43b of compression spring 43 is larger than hole diameter D4 of insertion hole portion 44c of holding plate 44, the other end 43b of compression spring 43 is inhibited from coming off into insertion hole portion 44c of holding plate 44.

Second Embodiment

Figure 7:
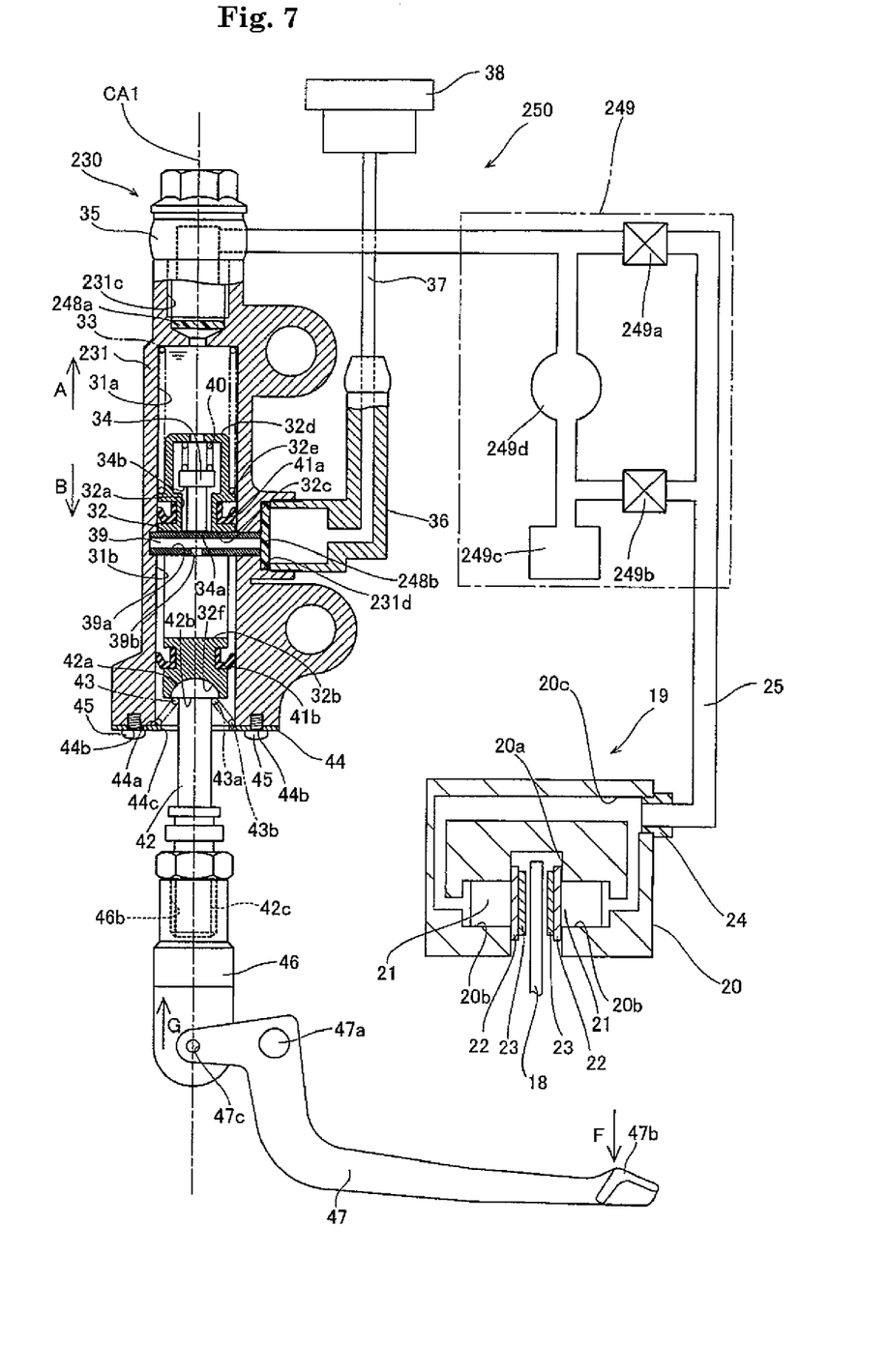
FIG. 7 is a cross sectional view of a rear caliper connected through an ABS unit to a rear brake control hydraulic master cylinder according to a second embodiment of the invention.
Figure 8:
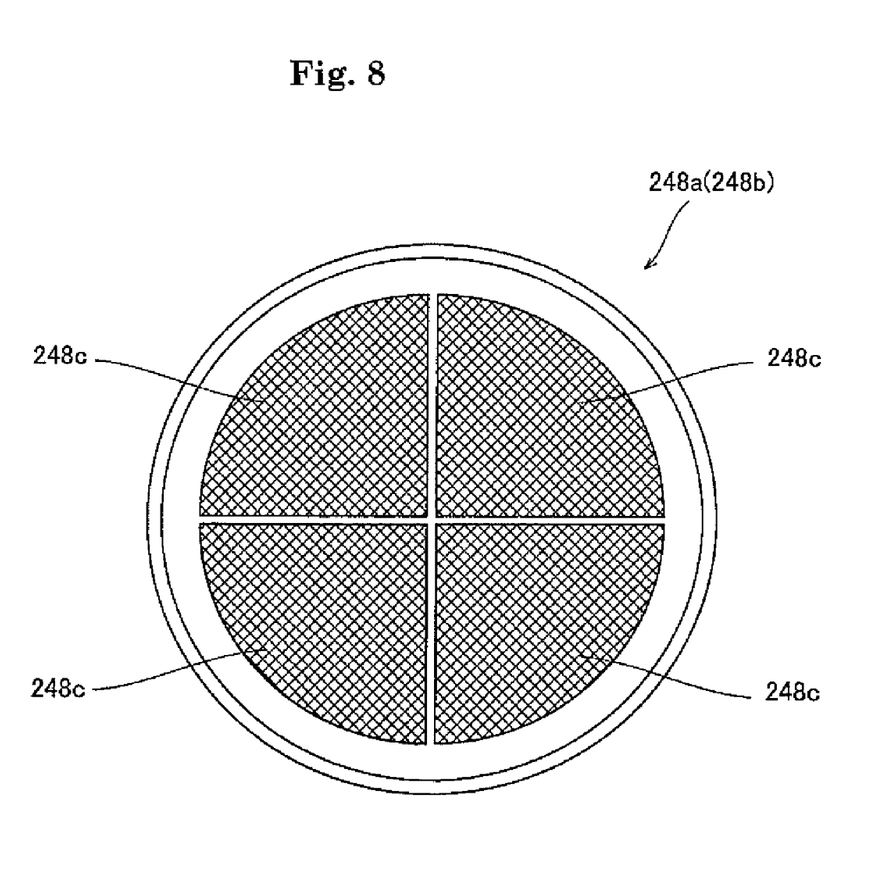
FIG. 8 is a plan view of a filter provided on the rear brake control hydraulic master cylinder of FIG. 7.

FIG. 7 is a cross sectional view showing a rear caliper connected through an ABS (Antilock Brake System) unit to a rear brake control hydraulic master cylinder according to a second embodiment of the invention. FIG. 8 is a plan view of a filter provided on the rear brake control hydraulic master cylinder of the second embodiment. Unlike the first embodiment, in the second embodiment filters 248a and 248b are provided in rear brake control hydraulic master cylinder 230, and an ABS unit 249 is provided between rear brake control hydraulic master cylinder 230 and a rear caliper 19.

Filters 248a and 248b, which serve to filter oil, are mounted to rear brake control hydraulic master cylinder 230. Specifically, filter 248a is press fitted into a first oil passage port 231c and filter 248b is press fitted into a second oil passage port 231d of a master cylinder 231. Filters 248a and 248b are columnar in shape and formed from a nylon resin so that a portion 248c, through which oil passes, is meshy. By mounting filters 248a and 248b to regions into which oil in master cylinder 231 flows, foreign matter is inhibited from invading master cylinder 231 when a rear brake 250 is assembled.

ABS unit 249, which ensures steerability at the time of quick braking, is provided between first oil passage port 231c, on which filter 248a is provided, and rear caliper 19. ABS unit 249 is an example of a "braking force control unit" of the invention. ABS unit 249 comprises a first control valve 249a, a second control valve 249b, a chamber 249c, a pump 249d, an ECU (Engine Control Unit) and a rear-wheel speed sensor. The rear-wheel speed sensor detects and outputs a speed of rear wheel 17 to the ECU. The ECU determines the presence of abnormality in rotation of rear wheel 17 whereby ABS unit 249 controls a braking force for rear wheel 17.

The remaining construction of the second embodiment is the same as that of the first embodiment, and a repeat explanation is therefore omitted.

First control valve 249a is opened and second control valve 249b is closed in a normal state. Hydraulic pressure from rear brake control hydraulic master cylinder 230 is thereby transmitted to rear caliper 19 through first control valve 249a and a braking force can be applied to rear wheel 17. When a driver brakes quickly, rear brake control hydraulic master cylinder 230 applies excessive hydraulic pressure to rear caliper 19, causing rear brake 250 to apply excessive braking force to rear wheel 17 and causing rear wheel 17 to lock. The ECU determines that a signal output from the rear-wheel speed sensor is abnormal and outputs a signal such that ABS unit 249 closes first control valve 249a and opens second control valve 249b. Hydraulic pressure from rear brake control hydraulic master cylinder 230 is thereby cut off and oil in rear caliper 19 flows into chamber 249c through second control valve 249b to decrease hydraulic pressure in rear caliper 19. Consequently, braking force from rear brake 250 is moderated and locking of rear wheel 17 is released. At this time, pump 249d is controlled to return oil in chamber 249c to rear brake control hydraulic master cylinder 230 and to further increase pressure in rear brake control hydraulic master cylinder 230. Foot lever 47 is thereby pushed back in a direction opposite to the arrow F direction. As described above, ABS unit 249 releases locking of rear wheel 17 to enable control of braking force on rear wheel 17.

According to the second embodiment, as described above, filter 248a is press fitted into first oil passage port 231c and filter 248b is press fitted into second oil passage port 231d of master cylinder 231. Filters 248a and 248b thereby prevent foreign matter from invading an interior of master cylinder 231 from rear caliper 19 and reservoir tank 38. Consequently, foreign matter cannot reach a contact area between center valve 34 and piston oil passage portion 32a, and a decrease in hydraulic pressure caused by foreign matter bitten in the contact area between center valve 34 and piston oil passage portion 32a is avoided.

Also, according to the second embodiment, ABS unit 249 is provided between first oil passage port 231c, on which filter 248a is provided, and rear caliper 19. Filter 248a thereby prevents foreign matter in ABS unit 249 and rear caliper 19 from invading master cylinder 231.

The remaining effects of the second embodiment are the same as that of the first embodiment, and repeat explanation is therefore omitted.

The embodiments disclosed herein are illustrative and not restrictive in all respects. The scope of the invention is indicated by the claims rather than the description of the embodiments, and embraces all changes that come within the meaning and range of equivalence therein.

For example, while an example in which a hydraulic master cylinder controls driving of a rear brake (rear caliper) has been described, the invention is not limited thereto and is applicable to a hydraulic master cylinder that controls driving of mechanisms other than a rear brake. For example, the invention may be applied to a hydraulic master cylinder to control driving of a front brake (front caliper) and to a hydraulic master cylinder to control driving of a clutch.

Also, while an example has been described in which the compression spring is arranged between the support portion of the holding plate and the flange portion of the push member to bias the flange portion of the push member toward the piston, the invention is not limited thereto. A bias member other than a compression spring, such as disc spring or leaf spring, may be arranged to bias a flange portion of a push member toward a piston.

Also, while a holding plate has been described as an example of a support member, the invention is not limited thereto. A circlip or a washer, for example, may be used to support the compression spring.

Also, while the invention has been described as applied to a motorcycle, the invention is not limited thereto and may be applied to other vehicles such as three-wheelers and ATVs (all-terrain vehicles), insofar as a hydraulic master cylinder is provided therein.

The invention claimed is:

1. A hydraulic master cylinder comprising:
a cylinder portion including a first oil chamber and a second oil chamber;
a piston including a first oil passage portion connected to the first and second oil chambers;
a push member that abuts against and moves the piston to generate hydraulic pressure in the first oil chamber;
a first bias member that biases the push member into contact with the piston when the piston is not moved substantially toward the first oil chamber; and
a second bias member provided in the first oil chamber of the cylinder portion to bias the piston toward the second oil chamber; wherein
the bias of the second bias member, by which the piston is biased toward the second oil chamber, is larger than the bias of the first bias member, by which the push member is biased toward the piston.

2. The hydraulic master cylinder according to claim 1, further comprising a support member fixed to the cylinder portion that supports the first bias member.

3. The hydraulic master cylinder according to claim 2, wherein
the first bias member includes a spring member,
the push member includes a flange portion that engages with the spring member,
the support member includes a support portion that supports the spring member, and
the spring member is arranged between the support portion of the support member and the flange portion of the push member.

4. The hydraulic master cylinder according to claim 3, wherein the support member is formed with an insertion hole into which the flange portion of the push member can be inserted.

5. The hydraulic master cylinder according to claim 4, wherein
a first outside diameter of one end of the spring member is smaller than an outside diameter of the flange portion of the push member, and
a second outside diameter of the other end of the spring member is larger than a hole diameter of the insertion hole of the support member.

6. The hydraulic master cylinder according to claim 3, wherein the spring member comprises a compression spring.

7. The hydraulic master cylinder according to claim 2, further comprising
a screw member that fixes the support member to the cylinder portion, wherein
the support member comprises a holding plate having a mount hole into which the screw member is inserted.

8. The hydraulic master cylinder according to claim 1, further comprising:
a reservoir tank connected to the second oil chamber of the cylinder portion; and
a cylindrical-shaped member including a second oil passage portion enabling communication between the reservoir tank and the second oil chamber, wherein
the piston is formed with a long hole portion extending in a direction in which the piston is moved into which the cylindrical-shaped member is inserted, and
one side of the long hole portion abuts against the cylindrical-shaped member in the case where the piston is not moved substantially toward the first oil chamber of the cylinder portion.

9. The hydraulic master cylinder according to claim 1, further comprising:
  a valve member provided in the first oil passage portion of the piston to close a side of the first oil passage portion toward the first oil chamber when the piston is moved toward the first oil chamber; and
  a third bias member that biases the valve member toward the second oil chamber to cause the valve member to close a side of the first oil passage portion toward the first oil chamber when the piston is moved toward the first oil chamber.

10. The hydraulic master cylinder according to claim 9, further comprising:
  a reservoir tank connected to the second oil chamber of the cylinder portion; and
  a cylindrical-shaped member provided in the second oil chamber of the cylinder portion and including a second oil passage portion enabling communication between the reservoir tank and the second oil chamber,
  wherein the valve member includes an abutting portion that abuts against the cylindrical-shaped member when the piston is not moved substantially toward the first oil chamber and when the push member contacts the piston, and is constructed so as not to close a side of the first oil passage portion toward the first oil chamber.

11. The hydraulic master cylinder according to claim 1, wherein the cylinder portion includes a first oil passage port connecting between the first oil chamber and a braking portion, and a second oil passage port connecting between the second oil chamber and a reservoir tank, and further comprising:
  a first filter provided in the first oil passage port; and
  a second filter provided in the second oil passage port.

12. The hydraulic master cylinder according to claim 11, wherein the braking portion is connected to the first oil passage port on which the first filter is provided through a braking force control unit to ensure steerability at the time of quick braking.

13. The hydraulic master cylinder according to claim 1, used for control of braking of a motorcycle.

14. A vehicle comprising the hydraulic master cylinder of claim 1.

15. A hydraulic master cylinder comprising:
  a cylinder portion including a first oil chamber and a second oil chamber;
  a piston including a first oil passage portion connected to the first and second oil chambers;
  a push member that abuts against and moves the piston to generate hydraulic pressure in the first oil chamber;
  a first bias member that biases the push member into contact with the piston when the piston is not moved substantially toward the first oil chamber; and
  a support member fixed to the cylinder portion that supports the first bias member; wherein
  the first bias member includes a spring member;
  the push member includes a flange portion that engages with the spring member;
  the support member includes a support portion that supports the spring member; and
  the spring member is arranged between the support portion of the support member and the flange portion of the push member.

16. The hydraulic master cylinder according to claim 15, wherein the support member is formed with an insertion hole into which the flange portion of the push member can be inserted.

17. The hydraulic master cylinder according to claim 16, wherein
  a first outside diameter of one end of the spring member is smaller than an outside diameter of the flange portion of the push member; and
  a second outside diameter of the other end of the spring member is larger than a hole diameter of the insertion hole of the support member.

18. The hydraulic master cylinder according to claim 15, wherein the spring member comprises a compression spring.

19. The hydraulic master cylinder according to claim 15, further comprising:
  a screw member that fixes the support member to the cylinder portion; wherein
  the support member comprises a holding plate having a mount hole into which the screw member is inserted.

* * * * *